United States Patent
Fuss

(10) Patent No.: US 8,737,019 B2
(45) Date of Patent: May 27, 2014

(54) SPINDLE MOTOR HAVING A LOW OVERALL HEIGHT

(71) Applicant: Thomas Fuss, Rottweil (DE)

(72) Inventor: Thomas Fuss, Rottweil (DE)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 13/967,538

(22) Filed: Aug. 15, 2013

(65) Prior Publication Data

US 2014/0049856 A1 Feb. 20, 2014

(30) Foreign Application Priority Data

Aug. 16, 2012 (DE) .......................... 10 2012 016 172

(51) Int. Cl.
*G11B 19/20* (2006.01)
(52) U.S. Cl.
USPC ....................................................... 360/99.08
(58) Field of Classification Search
USPC .......... 360/99.08, 99.16, 97.12, 97.17, 97.22; 720/721; 361/89, 90
See application file for complete search history.

(56) References Cited

U.S. PATENT DOCUMENTS

| 7,635,936 | B2 * | 12/2009 | Sumi ............................... 310/90 |
| 7,675,210 | B2 * | 3/2010 | Maekawa et al. ............... 310/90 |
| 2006/0031864 | A1 | 2/2006 | Kiriyama |
| 2009/0276996 | A1 * | 11/2009 | Maekawa et al. ............... 29/596 |
| 2011/0026163 | A1 * | 2/2011 | Komori et al. ............. 360/234.1 |
| 2013/0235489 | A1 * | 9/2013 | Aoshima .................... 360/99.08 |
| 2013/0279043 | A1 * | 10/2013 | Kodama et al. ............ 360/97.19 |

FOREIGN PATENT DOCUMENTS

| DE | 102007058151 | 6/2009 |
| DE | 102008052469 | 6/2009 |
| DE | 102008063092 | 7/2010 |
| DE | 102009022997 | 12/2010 |
| DE | 10201 1014369 | 9/2012 |
| EP | 1750352 | 2/2007 |

* cited by examiner

*Primary Examiner* — Allen T Cao
(74) *Attorney, Agent, or Firm* — Cooper & Dunham LLP

(57) ABSTRACT

The invention relates to a spindle motor that comprises a stationary motor component having a shaft and an annular stopper part disposed at a free end of the shaft as well as a rotatable motor component that is rotatably supported by means of a fluid dynamic bearing system with respect to the stationary motor component. The rotatable motor component is driven by an electromagnetic drive system. A housing cover covers the spindle motor. The invention is characterized in that the shaft has a step on which a stopper part rests, the end face of the stopper part projecting axially beyond the end face of the shaft, and the housing cover resting only on the end face of the stopper part but not on the end face of the shaft.

13 Claims, 3 Drawing Sheets

SPINDLE MOTOR HAVING A LOW OVERALL HEIGHT

BACKGROUND OF THE INVENTION

The invention relates to a spindle motor having a low overall height, particularly a spindle motor having a fluid dynamic bearing system as can be used to drive a hard disk drive (HDD).

PRIOR ART

Spindle motors, as used to drive the latest hard disk drives acting as electronic storage media, are miniature motors that are rotatably supported by means of a fluid dynamic bearing system.

This kind of spindle motor comprises a stationary motor component as well as a rotatable motor component that is rotatably supported about a rotational axis with respect to the stationary motor component by means of the fluid dynamic bearing system. The rotatable motor component is driven in rotation in a well-known manner by an electromagnetic drive system, consisting of a stator having coil windings as well as a permanent magnetic rotor. This kind of spindle motor is generally mounted on a baseplate that simultaneously acts as a lower housing component which can be sealed by means of a housing cover.

As a rule, relevant parts of the stationary and the rotatable motor components are simultaneously formed as bearing parts that have mutually associated bearing surfaces which are separated from one another by a bearing gap filled with bearing fluid. Fluid dynamic radial bearings as well as at least one fluid dynamic axial bearing are provided that have grooved bearing patterns associated with the bearing surfaces using a known method, which, on a relative movement of the bearing parts, exert a pumping effect on the bearing fluid disposed in the bearing gap. The pumping effect of the grooved bearing patterns causes hydrodynamic pressure to be generated within the bearing gap that, during operation, separates the bearing surfaces from one another in an almost friction-free way and gives the bearing its load-carrying capacity.

There are basically two different types of spindle motor: spindle motors having a stationary shaft and spindle motors having a rotatable shaft.

DE 10 2008 052 469 A1 shows a spindle motor having a stationary shaft, the spindle motor having a baseplate in which a first bearing part, approximately U-shaped in cross-section, is accommodated. A shaft is fixed in a central opening of this U-shaped bearing part. At the free end of the shaft, a stopper part is disposed that is integrally formed with the shaft as one piece. In the space formed between the bearing part, the shaft and the stopper part, a rotor component of the spindle motor rotates that is separated by a bearing gap from the stationary motor components, i.e. from the bearing part, the shaft and the stopper part. The bearing gap is filled with a bearing fluid, and respective fluid dynamic radial bearings and axial bearings are disposed along this bearing gap. The bearing gap has two open ends, each of which is sealed by sealing arrangements, preferably capillary sealing arrangements. At its upper end, the shaft has a tapped hole by means of which it is fixed to a housing cover of the spindle motor or the hard disk drive using an associated screw. The rotor component is driven by an electromagnetic drive system that has a stator arrangement which is disposed on the baseplate, as well as a rotor magnet that is attached opposite the stator arrangement to an inside circumference of the rotor component.

To date, spindle motors of a conventional design for driving 2.5 inch hard disk drives have a typical overall height of some 7 to 15 millimeters. Of this, approximately 4 to 8 mm are accounted for by the fluid dynamic bearing system, particularly the axially extending section of the bearing gap along which the fluid dynamic radial bearings are disposed. Approximately two millimeters of the overall height are needed for fixing the shaft in the bearing part and approximately a further 1.5 millimeters is taken up by the overall height of the stopper part and an associated cover cap.

Mobile electronic devices that typically have storage media, such as laptops, notebooks, netbooks, notepads, tablet PCs and other such devices are increasingly designed to be smaller and flatter, making it thus necessary to develop hard disk drives and spindle motors having correspondingly lower overall heights, thus allowing them to be installed in these devices. Hence, it is important for spindle motors to keep up with the development in mobile devices, with the future aim of an overall height for a spindle motor of approximately 5 mm to 7 mm. Based on the conventional design as described above, considerable changes in design and construction are needed to achieve this aim. On the one hand, the radial bearing span should be reduced as little as possible to prevent any deterioration in stability and bearing stiffness, and on the other hand the clamping system for the shaft in the bearing part or respectively the overall height of the stopper part should not be made too small, otherwise it will no longer be possible to attain the required holding power between the components. Moreover, the capillary sealing gap needs sufficient space to ensure an adequate sealing effect even under the impact of shock.

SUMMARY OF THE INVENTION

It is the object of the invention to reduce the overall height of a spindle motor of the type described in the opening paragraphs without impairing bearing stability and functionality.

The spindle motor according to the invention comprises a stationary motor component having a shaft and an annular stopper part disposed at a free end of the shaft as well as a rotatable motor component that is rotatably supported with respect to the stationary motor component by means of a fluid dynamic bearing system. The rotatable motor component is driven by an electromagnetic drive system. A housing cover covers the spindle motor.

The invention is characterized in that the shaft has a step on which a stopper part rests, the end face of the stopper part projecting axially beyond the end face of the shaft, and the housing cover resting only on the end face of the stopper part but not on the end face of the shaft.

According to the invention, the housing cover rests directly on an annular surface of the stopper part and is fixed to the shaft by means of a screw, the screw engaging in a central tapped hole in the shaft. Thanks to the screw, the stopper part is provided with an additional holding force for its attachment to the shaft, since, in the case of a flat spindle motor as designed according to the invention, only a relatively small axial joint length is available between the shaft and stopper part which, on its own, would not provide adequate strength.

The stopper part has a central bore into which the shaft engages with the end facing the housing cover, this end having a smaller diameter. Beyond the step on which the stopper part rests, i.e. in that section of the shaft that is connected to the stopper part, the shaft has a smaller outside diameter than in the remaining section along which the radial bearings are disposed. The step of the shaft forms a level supporting surface for the stopper part thus allowing the stopper part to be more precisely aligned with respect to the shaft. Ideally, the stopper part should be disposed precisely at a right angle to the rotational axis of the shaft. This contact surface, which also acts as an arrester, allows the stopper part to be positioned more easily and more precisely on the shaft in an axial direction as well.

The section of the bore in the stopper part facing the housing cover that is not penetrated by the shaft is chamfered, i.e. the diameter of this section widens from the shaft up to the upper end face of the stopper part.

In a preferred embodiment of the invention, the housing cover has at least one projection directed in the direction of the stopper part, the projection engaging in the tapered region of the central bore of the stopper part and determining the position of the housing cover on the stopper part. This projection may also be formed by deformation of the housing cover through screwing the fastening screw into the shaft.

The shaft is held in a stationary bearing part which in turn is fastened to a baseplate of the spindle motor. The stationary bearing part may be integrally formed with the shaft as one piece, although it is preferably formed as a separate component to the shaft.

The shaft is T-shaped in cross-section and for this purpose has a corresponding flange at one end that extends radially with respect to the rotational axis of the spindle motor and forms an axial bearing surface of the fluid dynamic bearing system, the stationary bearing part being integrally joined to the flange of the shaft.

The bearing gap of the fluid dynamic bearing system formed between the bearing parts is sealed by at least one sealing gap proportionally filled with a bearing fluid, the sealing gap taking the form of a tapered capillary seal, with a labyrinth seal or a gap seal that is partially free of bearing fluid being disposed beyond the sealing gap.

This labyrinth seal or gap seal respectively offers an additional safeguard against bearing fluid escaping from the sealing gap and, moreover, prevents excessive evaporation of bearing fluid from the bearing. It is preferable if additional gap seals or labyrinth seals are provided in the region of the two sealing gaps.

In a preferred embodiment of the invention, the rotatable motor component has a thread at an outside circumference for attaching a means of fastening provided with a thread. If the spindle motor is used, for example, for driving a hard disk drive such means of fastening can be used, for example, to fix storage disks to the rotatable motor component.

As already described above, the stationary bearing part at the lower end of the shaft may be formed integrally with the shaft as one piece, which means the interference fit, bonding or (laser) welded joint between the shaft and the stationary bearing part commonly used to date can be eliminated. However, an integral design of the shaft and bearing part makes it more difficult to machine the outside circumference of the shaft and the upper end face of the flange of the shaft. Particularly the bearing surfaces of the radial bearing and the bearing surfaces of an axial bearing have to be very precisely machined and, where necessary, surface treated, using, for example, slip- and/or wear-resistant coatings such as diamond-like carbon (DLC) or nickel.

According to the invention, it is thus preferable if the flange of the shaft and the bearing part are made from two separate parts and integrally joined together only after machining using a (laser) welded joint and/or an interference fit and/or a bonded joint.

The flange of the shaft preferably takes the form of a flat disk and, according to the invention, comprises a bearing surface of the axial bearing, whereas the stationary bearing part forms a periphery surface for a sealing arrangement for the bearing gap.

The spindle motor with the type of design according to the invention is particularly suitable for driving a hard disk drive having a low overall height that has at least one storage disk that is driven in rotation by the spindle motor. Hard disk drives have a read/write device for reading and writing data from and onto the storage disk. It is preferable if the housing cover of the spindle motor simultaneously forms the housing cover of the hard disk drive.

The invention is described in more detail below on the basis of several embodiments with reference to the drawings. Further characteristics and advantages of the invention can be derived from the drawings and the following description.

DESCRIPTION OF PREFERRED EMBODIMENTS OF THE INVENTION

Figure 1:
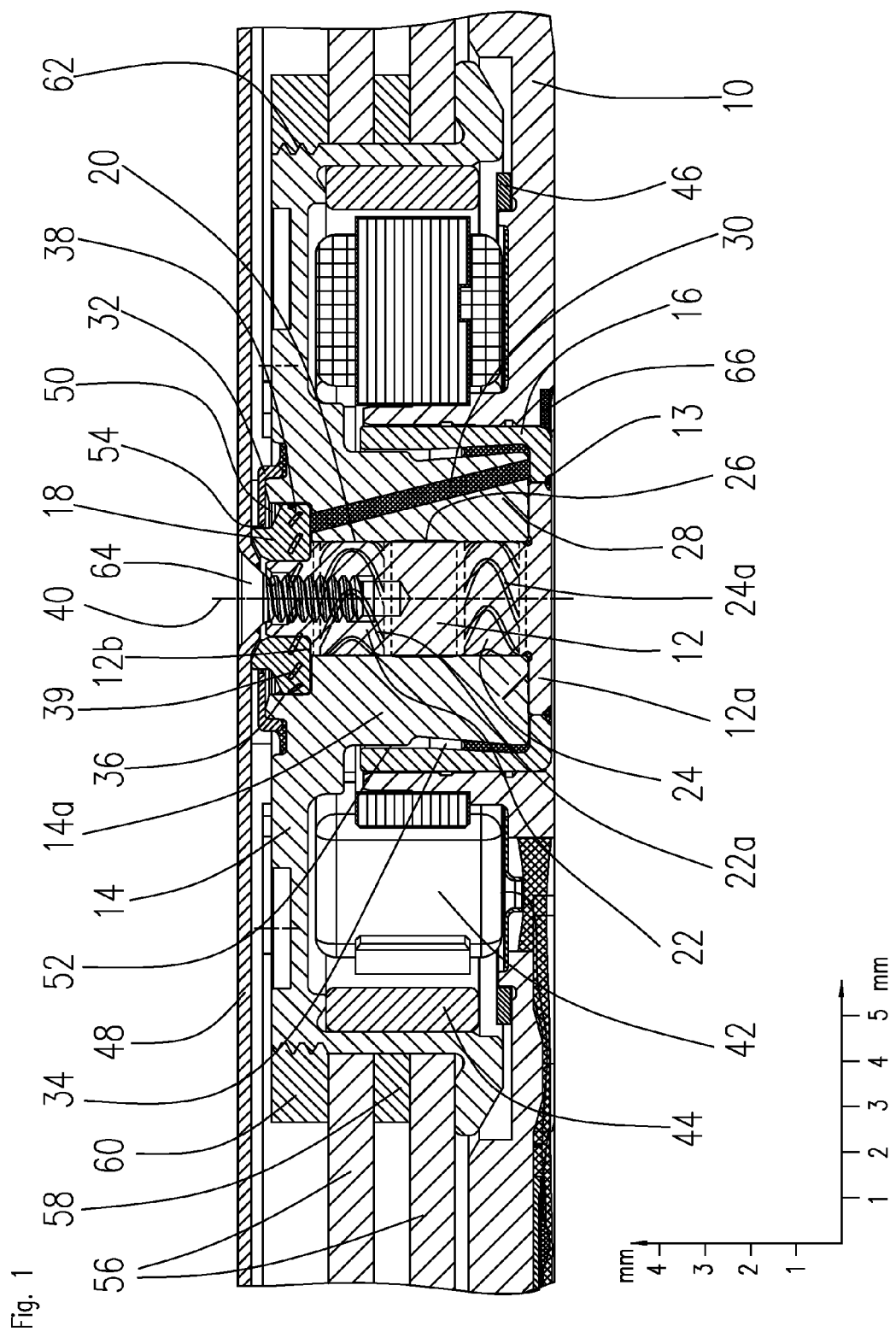
FIG. 1 shows a section through a spindle motor according to the invention in a first embodiment.
Figure 2:
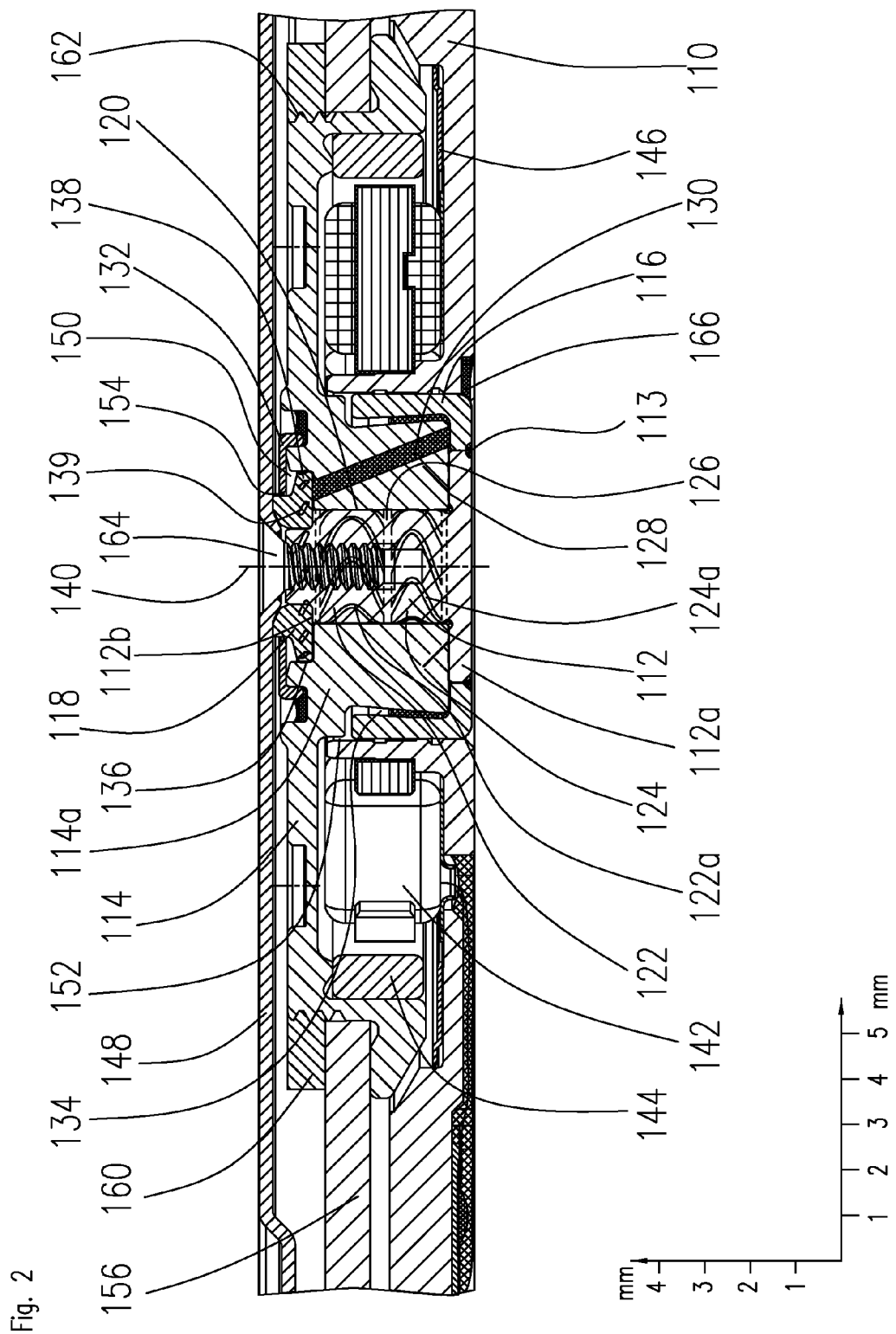
FIG. 2 shows a section through a spindle motor according to the invention in a second embodiment.
Figure 3:
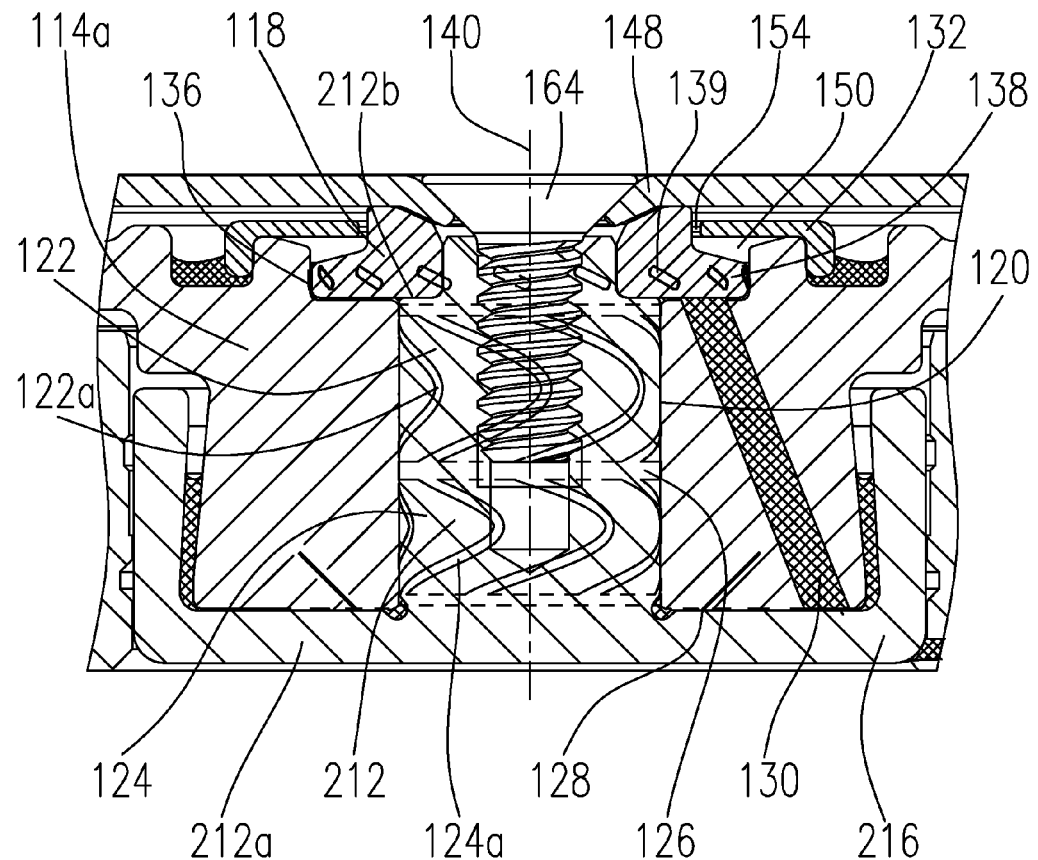
FIG. 3 shows a section through a spindle motor according to the invention in a third embodiment.
Figure 3:
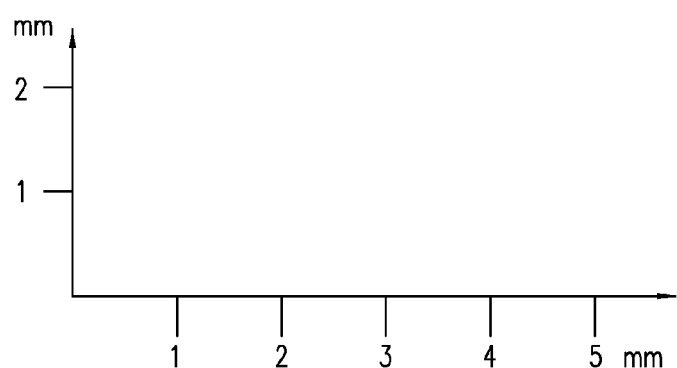

FIGS. 1 to 3 show three slightly different embodiments of a spindle motor according to the invention having a low overall height and a fluid dynamic bearing system. This kind of spindle motor can be used for driving the storage disks of a hard disk drive.

The spindle motors according to FIGS. 1 to 3 are largely identical in their basic construction and mainly differ in their overall height and the design of the sealing gaps. FIG. 1 shows a spindle motor having an overall height of approximately 7 mm, whereas FIGS. 2 and 3 show a spindle motor having an overall height of approximately 5 mm.

The basic construction of the spindle motor according to the invention is described on the basis of FIG. 1. The spindle motor comprises a baseplate 10 that has a substantially central cylindrical opening in which a stationary bearing part 16 is accommodated. The stationary bearing part 16 is approximately U-shaped in cross-section and has a central opening. The stationary bearing part 16 is disposed in the opening of the baseplate 10 using, for example, a transition fit and preferably additionally secured using adhesive. In order to avoid static charges to the storage disks 56, conductive adhesive is applied to at least one point along the circumference of the stationary bearing part 16 between the baseplate 10 and the stationary bearing part 16.

A cylindrical shaft 12 is provided that has a flange 12a at one end, so that the shaft 12 is approximately T-shaped in cross-section. The flange 12a of the shaft is disposed in the central opening in the stationary bearing part 16, the flange 12a abutting the inside circumference of the bearing part 16 with its outside circumference and being preferably integrally joined to this part. This integral joint may take the form of a circumferential weld seam 13. The stationary bearing part 16 may also be integrally formed with the flange 12a of the shaft 12 as one piece as illustrated in FIG. 3. However, this makes machining the surface of the shaft and the flange 12a more difficult. Designing the flange 12a and the bearing part 16 as two separate pieces allows the bearing surfaces located on the outside circumference of the shaft and on the upper end face of the flange 12a to be machined much more readily. The cylindrical part of the shaft 12 extends upwards in an axial direction from the radially extending base of the flange 12a.

An annular stopper part 18 is disposed at the free end of the shaft 12 whose diameter is substantially larger than the diameter of the shaft 12 and which is preferably attached to the shaft 12 using a force fit or integral joint. In particular, the shaft 12 has a reduced diameter at its free end such that a step 12b is formed. The step 12b defines an arrester for the stopper part on which the stopper part 18 rests. The stopper part 18 is thereby disposed and aligned precisely on the shaft and a holding force directed downwards in an axial direction is ensured. Moreover, an axial space for receiving a bearing bush 14a is defined by this step 12b on the shaft 12. The shaft 12 and the flange 12a together with the bearing part 16 and the stopper part form a compact arrangement. The entity formed by the said components 10, 12, 12a, 16 and 18 forms the stationary bearing part of the spindle motor.

The spindle motor further comprises a rotor component 14 that comprises a cylindrical bearing bush 14a. The rotor component 14, more specifically, the bearing bush 14a of the rotor component 14, is disposed in a space formed by the shaft 12, 12a and the two components 16, 18 to be rotatable about a rotational axis 40 with respect to these components 12, 12a, 16, 18. The stopper part 18 is at least partially disposed in an annular recess in the rotor component 14.

Mutually adjoining surfaces of the shaft 12, 12a the bearing bush 14 and the two components 16, 18 are separated from one another by a bearing gap 20 open at both ends and filled with a bearing fluid, such as bearing oil.

The bearing bush 14a disposed on the rotor component 14 and preferably integrally formed as one piece has a cylindrical bearing bore on whose inside circumference two cylindrical radial bearing surfaces are formed that are axially spaced apart from one another by a separator gap 26. The radial bearing surfaces enclose the stationary shaft 12 at a distance of between 1.5 and 3.5 micrometers while forming an axially extending section of the bearing gap 20 and forming together with opposing bearing surfaces of the shaft 12 two fluid dynamic radial bearings 22, 24. The bearing surfaces of the two radial bearings 22, 24 are provided, for example, with sine-shaped or parabola-shaped (herringbone) grooved bearing patterns 22a, 24a. The upper radial bearing 22 is largely symmetrical in design, which means that the part of the grooved bearing patterns 24 that is disposed above the apex is made approximately as long as the lower part of the bearing grooves. The pumping effect of both parts of the radial bearing grooves 24 is directed in the direction of the apex, i.e. towards the center of the bearing, thus giving the radial bearing 22 its load-carrying capacity. However, due to the symmetric design of the radial bearing grooves 24 of the upper radial bearing 22, there is no defined pumping direction that acts on the bearing fluid in the bearing gap 20. In contrast, the lower radial bearing 24 is made asymmetric in as much as the part of the grooved bearing patterns 24a that is disposed below the apex is made longer than the upper part of the radial bearing grooves 24a. This results, on the one hand, in an increase in pressure within the bearing fluid in the direction of the apex of the radial bearing 24, thus giving the radial bearing 24 its load-carrying capacity, and on the other hand, a defined pumping effect is exerted on the bearing fluid located in the bearing gap 20 that conveys the bearing fluid axially upwards in the direction of the upper radial bearing 22. The separator gap 26 has a significantly larger gap width compared to the axial section of the bearing gap 20 in the area of the radial bearings.

Below the lower radial bearing 24, the axially extending section of the bearing gap 20 merges into a radially extending section along which a fluid dynamic axial bearing 28 is disposed. The axial bearing 28 is formed by radially extending bearing surfaces on the end face of the bearing bush 14a and corresponding opposing bearing surfaces of the flange 12a of the shaft 12. The bearing surfaces of the axial bearing 28 are formed as circular rings perpendicular to the rotational axis 40. The fluid dynamic axial bearing 28 is marked in a familiar way by, for example, spiral-shaped grooved bearing patterns that may be provided either on the end face of the bearing bush 14a, on the flange 12a or on both parts.

The axial bearing surface is preferably disposed only between the radially extending surface of the flange 12a and the opposing lower face of the bearing bush 14a. The adjoining and also radially extending surface of the stationary bearing part 16 is disposed about 10 to 100 micrometers lower than the radially extending surface of the flange 12a, which means that when the fluid dynamic bearing is fully assembled there is a respectively larger gap distance between the radially extending surfaces of the bearing bush 14a and the stationary bearing part 16.

It is advantageous if all the grooved bearing patterns required for the radial bearings 22, 24 and the axial bearing 28 are disposed on respective bearing surfaces of the bearing bush 14a, thus simplifying the manufacture of the bearing, particularly the high-precision bearing surfaces on the shaft 12 and the flange 12a. The axial bearing grooves preferably lead radially outwards into a ring gap that has a larger gap width than the axial bearing gap. This ring gap starts approximately at that point where a recirculation channel 30, which is provided within the rotor component 14, leads into the radial extension of the axial bearing gap 28.

A first capillary sealing gap 34 proportionally filled with bearing fluid adjoins the radial section of the bearing gap 20 in the region of the axial bearing 28 or of the ring gap respectively. The sealing gap 34 is formed by mutually opposing and substantially axially extending surfaces of the bearing bush 14a and the bearing part 16 and seals the bearing gap 20 at this end. The sealing gap 34 comprises the short, radially extending section of the ring gap that is wider than the bearing gap 20 and disposed radially outside the axial bearing 28. The short, radially extending section of the sealing gap 34 merges into a longer, tapered and almost axially extending section that is defined by an outer circumferential surface of the bearing bush 14a and an inner circumferential surface of the bearing part 16. Alongside its function as a capillary seal, the sealing gap 34 acts as a fluid reservoir and supplies the amount of fluid required for the useful life of the bearing system. Moreover, filling tolerances and any thermal expansion of the bearing fluid can be compensated. The two surfaces of the bearing bush 14a and the bearing part 16 forming the tapered section of the sealing gap 34 may both be inwardly inclined with respect to the rotational axis 40 as the sealing gap extends towards the outside of the bearing. The angle of inclination is preferably between 0 degrees and 5 degrees. Here, the angle of inclination of the outer circumferential surface of the rotor component 14 is larger than the angle of inclination of the inner circumferential surface of the bearing part 16, thus producing a tapered extension of the capillary seal. This causes the bearing fluid on rotation of the bearing to be forced inwards in the direction of the bearing gap 20 due to the centrifugal force.

At the other end of the bearing system, the rotor component 14 or the bearing bush 14a respectively adjoining the upper radial bearing 22 is designed such that it forms a radially extending surface that, together with a corresponding opposing surface of the stopper part 18, forms a radial gap. An axially extending second sealing gap 36 adjoins the radial gap, the second sealing gap 36 being proportionally filled with bearing fluid and sealing the bearing gap 20 at this end. The second sealing gap 36 is defined by mutually opposing surfaces of the rotor component 14 and of the stopper part 18 and widens at the outer end, preferably having a tapered cross-section. Here, the outer circumferential surface of the stopper part 18 is inclined slightly inwards in the direction of rotational axis 40 as it extends towards the outside of the bearing. The opposing inner circumferential surface of the rotor component 14 extends either parallel to the rotational axis 40 or is also slightly inclined inwards, the angle of inclination, however, being smaller than the angle of inclination of the outer circumferential surface of the stopper part 18, thus producing a tapered capillary seal. The second sealing gap 36 can preferably be enhanced by a pumping seal 38 that is disposed below the capillary seal. The pumping seal 38 is preferably formed between the outside circumference of the stopper part 18 and the opposing surface of the rotor component 14. The pumping seal 38 comprises grooved patterns 39 that are disposed on the surface of the stopper part 18 or preferably of the rotor component 14. When the bearing rotates, the grooved patterns 39 of the pumping seal 38 exert a pumping effect on the bearing fluid located in the sealing gap 36. This pumping effect is directed towards the interior of the bearing gap, i.e. in the direction of the radial bearing 22. Provision can thereby be made for the grooved pumping patterns to partially extend into the lower region of the capillary seal. It is, however, preferable if the grooved pumping patterns 39 do not extend into the radially extending gap that is formed between the lower face of the stopper part 18 and the bearing bush 14a.

The second sealing gap 36 is covered by an annular shaped cover 32. The cover 32 is placed on a rim of the rotor component 14 and bonded there for example, the cover 32 resting on a circumferential rim of the rotor component 14. An inner rim of the cover 32, together with the outside circumference of the stopper part 18, forms an air gap acting as a gap seal 54. This gap seal 54 is an additional safeguard against bearing fluid leaking out of the sealing gap 36 or respectively reduces evaporation of bearing fluid and thus increases the useful life of the fluid bearing.

At the axially outer end of the sealing gap 36, the sealing gap widens into a free space 50 that is preferably so large that it can receive the full volume of bearing fluid located in the bearing. This free space 50 is particularly used for filling the bearing with bearing fluid. The bearing gap and the sealing gap are thereby preferably evacuated and the entire volume of bearing fluid filled into the free space 50. The bearing gap is then aerated again causing the volume of bearing fluid to be forced out of the free space 50 into the bearing and the sealing gap.

A recirculation channel 30 extends from the gap between the end face of the rotor component 14 and an opposing end face of the stopper part 18 obliquely downwards through the rotor component 14 and ends radially outside the axial bearing 28 in the radially extending section of the sealing gap 34 (ring gap).

The spindle motor has an electromagnetic drive system that is formed in a familiar way by a stator arrangement 42 disposed on a baseplate 10 and an annular permanent magnet 44 that concentrically encloses the stator arrangement at a clearance and which is disposed on an inner circumferential surface of the rotor component 14. This then represents an outer rotor motor, although an inner rotor motor could also be used as an alternative without any qualifications, in which the stator arrangement is disposed radially outside the rotor magnet.

Since the spindle motor preferably has only one single fluid dynamic axial bearing 28 that generates a force on the rotor component 14 in the direction of the stopper part 18, a corresponding counter force or preload force is needed to keep the rotor component 14 in equilibrium axially. For this purpose, the stator arrangement 42 and the rotor magnet 44 are axially offset against one another, such that the magnetic center of the rotor magnet 44 is disposed axially further away from the baseplate 10 than the center of the stator arrangement 42. In this way, an axial force is exerted on the rotor component 14 by the magnetic system of the motor which acts in the opposite direction to the bearing force of the axial bearing 28 when the bearing is in operation. Moreover, as an alternative or in addition to the offset of the drive system, a pull ring 46 made of a ferromagnetic material and fixed to the baseplate may be provided below the rotor magnet 44. The pull ring 46 is magnetically attracted by the rotor magnet 44, so that an axial magnetic force acting on the rotor component 14 is generated that counteracts the bearing force of the fluid dynamic axial bearing 28.

Hitherto, it has been known for the free end of the shaft 12, at the end on which the stopper part 18 is disposed, to be fixedly connected by means of a screw connection to a housing cover 48 of the spindle motor or of the hard disk drive.

The invention provides that the housing cover 48 does not rest directly on the end face of the shaft 12 but rather on an end face of the stopper part 18.

The stopper part 18 is preferably pressed onto the shaft 12 until it rests on the step 12b of the shaft. Here, the overall axial height of the stopper part is dimensioned such that the end face of the stopper part 18 projects beyond the end face of the shaft 12 so that there is no contact between the housing cover 48 and the end face of the shaft 12. The housing cover 48 is thereby connected to the shaft by means of a screw that engages into a tapped hole in the shaft 12. Through this direct connection between the shaft 12 and the housing cover 48, the stopper part 18 located between the shaft 12 and the housing cover 48 is additionally pressed and positioned on the step 12b of the shaft. Hence, despite the comparatively small axial joint length, the stopper part 18 remains firmly connected to the shaft 12, even in the case of shock.

At the upper end of the first sealing gap 34, where the sealing gap 34 has its greatest width, the gap narrows again significantly between the stationary bearing part 16 and the outside circumference of the bearing bush 14a and forms a labyrinth seal 52. For one thing, this labyrinth seal 52 prevents bearing fluid from leaking out of the sealing gap 34 and, for another, it prevents excessive evaporation of bearing fluid from the region of the sealing gap 34, which goes to increase the useful life of the fluid bearing. The labyrinth seal has, for example, a gap width of approximately 60 μm and a length of 1 mm.

The spindle motor can preferably be used for driving a hard disk drive, where one or more storage disks 56 can be fixed to the rotor component 14. The storage disks 56 are placed on an outer flange of the rotor component 14 and kept apart by a spacer 58.

The storage disks are fixed to the rotor component by means of a threaded ring 60 that is screwed onto a thread 62 on the outside circumference of the rotor component 14.

The bearing grooves of the fluid dynamic bearing system are preferably manufactured using electro-chemical machining (ECM,), the separator gap 26 being machined mechanically (as in FIG. 1) or using ECM (as in FIG. 2).

FIG. 2 shows a spindle motor that in its basic construction corresponds to the spindle motor of FIG. 1. Identical components are here indicated with the same reference numbers as in FIG. 1, a "1" being placed before each number, so that "10" in FIG. 1 corresponds to "110" in FIG. 2. Reference is moreover made to the basic description of the spindle motor according to FIG. 1.

The spindle motor of FIG. 2 is reduced in its overall height to approximately 5 millimeters, it being immediately obvious that as a result the distance between the two radial bearings 122 and 124 is smaller, i.e. the axial length of the separator gap 126 is significantly smaller than in the spindle motor of FIG. 1.

Here, the housing cover 148 also rests directly on the end face of the stopper part 118 but not on the end face of the shaft 112.

The housing cover 148 is connected directly to the shaft 112 by means of a threaded screw 164, the threaded screw 164 engaging into a tapped hole in the shaft 112.

A counter-sunk screw may preferably be used as the threaded screw 164 that on screwing into the shaft 112 presses the (perhaps preformed) rims of the bore in the housing cover 148 into the chamfered bore of the stopper part 118 and thus immovably positions the housing cover 148 on the stopper part.

As an additional seal for the first sealing gap 134, it is not possible to use a labyrinth seal having an axial extension between the bearing part 116 and the bearing bush 114a as used in FIG. 1, since the overall height of the bearing is too small. Instead a labyrinth seal 152 is proposed here between the edge face of the stationary bearing part 116 and a lower face of the rotor component 114 or respectively an axial gap 152 between an inner circumferential surface of the cylindrical shoulder of the baseplate 110 and an outer circumferential surface of the rotor component 114. The upper gap or labyrinth seal 154 between the cover 132 and the stopper part 118 is retained.

When the spindle motor is used to drive a hard disk drive, a storage disk 156 can preferably be placed on the flange-like projection of the rotor component 114. The storage disk 156 is then firmly screwed on using a threaded ring 160 and the thread 162 of the rotor component 114.

A pull ring 146 is again used as an axial magnetic counter bearing to the fluid dynamic axial bearing 128, the pull ring 146 in this embodiment being formed as a molded flat sheet so as to save overall height.

The stopper part 118 is also made overall flatter compared to the spindle motor of FIG. 1, so that the gap length of the upper sealing gap 136 is somewhat smaller in an axial direction.

FIG. 3 shows a detail of a spindle motor according to the invention that is made almost identical to the spindle motor illustrated in FIG. 2.

We can see the stationary bearing part 216 that in this embodiment is integrally formed with the shaft 212 as one piece or with its flange 212a. Compared to the overall height of a stationary bearing part of a conventional spindle motor, the overall height of the bearing part 216 is significantly reduced according to the invention.

The stopper part 118 is disposed at the upper end of the shaft 212 and lies in a recess of the rotor component 114. The stopper part 118 is pressed onto an upper end of the shaft 212 and rests on a step 212b of the shaft 212, the stopper part 118 projecting upwards in an axial direction considerably beyond the end of the shaft 212.

The housing cover 148 rests directly on the stopper part 118 without touching the shaft 212.

By means of a threaded screw 164 that engages into a tapped hole in the shaft 212, the shaft is fixed directly to the housing cover 148 and clamps the stopper part 118 between the step of the shaft and the housing cover 148.

IDENTIFICATION REFERENCE LIST 10, 110 Baseplate
12, 112, 212 Shaft
12a, 112a, 212a Flange
12b, 112b, 212b Step of the shaft
13, 113 Weld seam
14, 114 Rotor component
14a, 114a Bearing bush
16, 116, 216 Bearing part
18, 118 Stopper part
20, 120 Bearing gap
22, 122 Radial bearings
22a, 122a Grooved bearing patterns
24, 124 Radial bearing
24a, 124a Grooved bearing patterns
26, 126 Separator gap
28, 128 Axial bearing
30, 130 Recirculation channel
32, 132 Cover
34, 134 Sealing gap
36, 136 Sealing gap
38, 138 Pumping seal
39, 139 Grooved pumping patterns
40, 140 Rotational axis
42, 142 Stator arrangement
44, 144 Rotor magnet
46, 146 Pull ring
48, 148 Housing cover
50, 150 Free space
52, 152 Labyrinth seal
54, 154 Gap seal
56, 156 Storage disk
58 Spacer
60, 160 Threaded ring
62, 162 Thread
64, 164 Threaded screw
66, 166 Conductive adhesive

The invention claimed is:

1. A spindle motor having a low overall height that comprises:
   a stationary motor component, having a shaft and an annular stopper part disposed at a free end of the shaft,
   a rotatable motor component,
   a fluid dynamic bearing system to rotatably support the rotatable motor component with respect to the stationary motor component,
   an electromagnetic drive system for driving the rotatable motor component about a rotational axis, and
   a housing cover for covering the spindle motor,
   wherein the shaft has a step on which the stopper part rests, wherein the end face of the stopper part projects axially beyond the end face of the shaft, and the housing cover rests only on the end face of the stopper part but not on the end face of the shaft.

2. A spindle motor according to claim 1, wherein the housing cover is fixed to the shaft by means of a screw, said screw engaging into a central tapped hole in the shaft.

3. A spindle motor according to claim 1, wherein the stopper part has a central bore having a first section and a second section, wherein the shaft engages into the first section, and the diameter of the second section increases from the first section up to the upper end face of the stopper part.

4. A spindle motor according to claim 1, wherein the housing cover has at least one projection directed in the direction of the stopper part that engages into the central bore of the stopper part.

5. A spindle motor according to claim 1, wherein the stopper part is connected to the shaft by means of an interference fit.

6. A spindle motor according to claim 1, wherein the shaft is held in a stationary bearing part.

7. A spindle motor according to claim 6, wherein the stationary bearing part is integrally formed with the shaft as one piece.

8. A spindle motor according to claim 6, wherein that the shaft has a flange that extends radially with respect to the rotational axis of the spindle motor and forms an axial bearing surface, wherein the stationary bearing part is joined to the flange of the shaft.

9. A spindle motor according to claim 1, wherein that the shaft has a flange that extends radially with respect to the rotational axis of the spindle motor and forms an axial bearing surface.

10. A spindle motor according to claim 9, wherein the flange is integrally formed with the shaft as one piece.

11. A spindle motor according to claim 1, wherein the bearing gap of the fluid dynamic bearing system is sealed by at least one sealing gap proportionally filled with a bearing fluid, wherein a labyrinth seal that is free of bearing fluid is disposed beyond the sealing gap.

12. A spindle motor according to claim 1, wherein the rotatable motor component has a thread on an outside circumference used for attaching a means of fastening that is provided with a thread.

13. A hard disk drive having a low overall height having at least one storage disk that is driven in rotation by a spindle motor, and further comprising a read/write device for reading and writing data from and to the storage disk, wherein the spindle motor comprising a stationary motor component, having a shaft and an annular stopper part disposed at a free end of the shaft, a rotatable motor component, a fluid dynamic bearing system to rotatably support the rotatable motor component with respect to the stationary motor component, an electromagnetic drive system for driving the rotatable motor component about a rotational axis, and a housing cover for covering the spindle motor, wherein the shaft has a step on which the stopper part rests, wherein the end face of the stopper part projects axially beyond the end face of the shaft, and the housing cover rests only on the end face of the stopper part but not on the end face of the shaft.

\* \* \* \* \*